(12) United States Patent
Li et al.

(10) Patent No.: US 9,092,096 B2
(45) Date of Patent: Jul. 28, 2015

(54) LOW-COST MASS-PRODUCED TOUCH SENSORS

(75) Inventors: Jeffrey Li, Palo Alto, CA (US); Paul P. Campbell, San Jose, CA (US); Khanh M. Le, Morgan Hill, CA (US); David M. Holmes, Cupertino, CA (US)

(73) Assignee: Pure Imagination, LLC, Vancouver, WA (US)

( * ) Notice: Subject to any disclaimer, the term of this patent is extended or adjusted under 35 U.S.C. 154(b) by 450 days.

(21) Appl. No.: 12/843,201

(22) Filed: Jul. 26, 2010

(65) Prior Publication Data
US 2012/0019475 A1 Jan. 26, 2012

(51) Int. Cl.
*G06F 3/044* (2006.01)

(52) U.S. Cl.
CPC ..................... *G06F 3/044* (2013.01)

(58) Field of Classification Search
CPC ..... G06F 3/03547; G06F 3/041; G06F 3/046; G06F 3/047; G06F 3/044; G06F 3/045; G06F 2203/041; G06F 2203/04107; G06F 2203/04111–2203/04113
USPC .............. 345/156–157, 173–174; 216/33, 43; 427/511
See application file for complete search history.

(56) References Cited

U.S. PATENT DOCUMENTS

| | | | |
|---|---|---|---|
| 4,213,367 A | 7/1980 | Moog | |
| 4,299,041 A | 11/1981 | Wilson | |
| 4,852,443 A | 8/1989 | Duncan et al. | |
| 5,009,463 A * | 4/1991 | Saitoh et al. | .......... 296/210 |
| 5,129,654 A | 7/1992 | Bogner | |
| 5,188,368 A | 2/1993 | Ryan | |
| 5,283,711 A | 2/1994 | Schmitz | |
| 5,413,518 A | 5/1995 | Lin | |
| 5,538,430 A | 7/1996 | Smith | |

(Continued)

FOREIGN PATENT DOCUMENTS

| | | |
|---|---|---|
| JP | 2007-324088 A | 12/2007 |
| KR | 10-2007-0032924 A | 3/2007 |

(Continued)

OTHER PUBLICATIONS

Gary Paumen, Office Action on U.S. Appl. No. 13/104,878, mailed Oct. 16, 2012, USPTO, US.

(Continued)

*Primary Examiner* — Kenneth Bukowski
(74) *Attorney, Agent, or Firm* — Rylander & Assoc., PC; Philip R. M. Hunt

(57) ABSTRACT

A capacitive touch sensor has a clear top plastic film and graphics or other designs disposed on its reverse side. Only the bare plastic substrate is exposed to the environment and user wear. Non-conductive color inks are used in printing the graphics so that any printed capacitive sensors in contact behind will not be short circuited or desensitized. A silk-screened base color layer with a print-free margin left all around its edges allows a later application of adhesive to grip a more durable surface underneath. Capacitive touch sensors are deposited on a bottom plastic film with silvered conductive inks. The printed capacitive sensors on film are fastened with a silk-screen applied liquid water-based adhesive and face the graphics printed side of the first plastic film. A final overcoat of adhesive is applied to the bare backside of the bottom plastic film for final assembly to a frame or chassis.

4 Claims, 7 Drawing Sheets

(56) References Cited

U.S. PATENT DOCUMENTS

| | | | |
|---|---|---|---|
| 5,645,432 A | 7/1997 | Jessop | |
| 5,853,327 A | 12/1998 | Gilboa | |
| 6,168,158 B1 | 1/2001 | Bulsink | |
| 6,661,239 B1 | 12/2003 | Ozick | |
| 6,819,316 B2 | 11/2004 | Schulz | |
| 6,822,640 B2* | 11/2004 | Derocher | 345/173 |
| 6,828,806 B1 | 12/2004 | Hirota et al. | |
| 7,242,393 B2 | 7/2007 | Caldwell | |
| 7,276,917 B2 | 10/2007 | Deangelis et al. | |
| 7,301,351 B2 | 11/2007 | Deangelis et al. | |
| 7,368,921 B2 | 5/2008 | Deangelis et al. | |
| 7,395,717 B2 | 7/2008 | DeAngelis et al. | |
| 7,408,109 B1 | 8/2008 | Freitas | |
| 7,439,962 B2 | 10/2008 | Reynolds et al. | |
| 7,465,869 B1 | 12/2008 | Freitas | |
| 7,477,242 B2 | 1/2009 | Cross | |
| 7,578,195 B2 | 8/2009 | DeAngelis et al. | |
| 7,737,953 B2 | 6/2010 | Mackey | |
| 7,784,366 B2 | 8/2010 | Daverman et al. | |
| 7,932,898 B2 | 4/2011 | Philipp et al. | |
| 8,044,665 B2 | 10/2011 | Joutsenoja et al. | |
| 8,552,991 B2* | 10/2013 | Yoon | 345/173 |
| 2001/0033009 A1* | 10/2001 | Inoue et al. | 257/668 |
| 2006/0038791 A1 | 2/2006 | Mackey | |
| 2007/0031161 A1 | 2/2007 | Iandoli | |
| 2007/0062739 A1 | 3/2007 | Philipp et al. | |
| 2007/0164994 A1 | 7/2007 | Inoue et al. | |
| 2007/0229464 A1 | 10/2007 | Hotelling et al. | |
| 2008/0202912 A1* | 8/2008 | Boddie et al. | 200/600 |
| 2008/0236374 A1 | 10/2008 | Kramer et al. | |
| 2008/0238433 A1 | 10/2008 | Joutsenoja et al. | |
| 2008/0238448 A1 | 10/2008 | Moore et al. | |
| 2008/0238706 A1 | 10/2008 | Kenwright | |
| 2009/0260508 A1 | 10/2009 | Elion | |
| 2009/0309303 A1 | 12/2009 | Wallace et al. | |
| 2009/0315258 A1 | 12/2009 | Wallace et al. | |
| 2010/0079153 A1 | 4/2010 | Maloof et al. | |
| 2010/0117660 A1 | 5/2010 | Douglas et al. | |
| 2010/0231555 A1 | 9/2010 | Mackey | |
| 2010/0244809 A1 | 9/2010 | Joutsenoja et al. | |
| 2010/0244810 A1 | 9/2010 | Joutsenoja et al. | |
| 2010/0283755 A1* | 11/2010 | Hsih | 345/174 |
| 2011/0050620 A1 | 3/2011 | Hristov | |
| 2011/0109590 A1* | 5/2011 | Park | 345/174 |
| 2011/0197333 A1 | 8/2011 | Liotta | |
| 2011/0197334 A1 | 8/2011 | Liotta | |
| 2011/0197742 A1 | 8/2011 | Liotta | |
| 2011/0199333 A1 | 8/2011 | Philipp et al. | |
| 2012/0024132 A1 | 2/2012 | Wallace et al. | |

FOREIGN PATENT DOCUMENTS

| | | | |
|---|---|---|---|
| KR | 10-2007-007248 A | | 7/2007 |
| WO | PCT/KR2009/001610 | * | 12/2009 |
| WO | 2011/143260 A2 | | 11/2011 |
| WO | 2011/160038 A2 | | 12/2011 |
| WO | 2012/015964 A2 | | 2/2012 |
| WO | 2012/116233 A2 | | 8/2012 |

OTHER PUBLICATIONS

Andrew R. Millikin, Office Action on U.S. Appl. No. 12/192,257, mailed Jun. 6, 2012, USPTO, US.

Jianchun Qin, Office Action on U.S. Appl. No. 13/163,401, mailed Sep. 18, 2012, USPTO, US.

Novacentrix, "MetalonTMConductiveInksforPrintedElectronics", http://www.novacentrix.com/images/downloads/InkBrochure2008revb.pdf, Apr. 11, 2009.

Hwan, Written Opinion of the International Searching Authority PCT/US2011/035980, ISA/KR, Republic of Korea.

Lee, Written Opinion of the International Searching Authority PCT/US2011/040913, ISA/KR, Republic of Korea.

Lee, Written Opinion of the International Searching Authority PCT/US2011/045598, ISA/KR, Republic of Korea.

Kim, Written Opinion of the International Searching Authority PCT/US2012/026401, ISA/KR, Republic of Korea.

Elvin Enad, International Preliminary Report on Patentability (corrected), PCT/US11/40913, Oct. 20, 2012, pp. 1-26, IPEA/USPTO, Alexandria VA, USA.

Elvin Enad, International Preliminary Report on Patentability, PCT/US11/45598, Jan. 16, 2013 pp. 1-28, IPEA/USPTO, Alexandria VA, USA.

Jianchun Qin, Office Action, U.S. Appl. No. 13/673,880, Mar. 18, 2013, pp. 1-7, USPTO, Alexandria VA, USA.

Gary F Pauman, Office Action, U.S. Appl. No. 13/668,128, Feb. 21, 2013, pp. 1-6, USPTO, Alexandria VA, USA.

Thomas Fermentel, Supplemental European Search Report, 11781173.7-1805 / 2569645 PCT/US2011035980, Aug. 14, 2014, EPO, The Hague, Netherlands.

* cited by examiner

LOW-COST MASS-PRODUCED TOUCH SENSORS

BACKGROUND OF THE INVENTION

1. Field of the Invention

The present invention relates to electronic capacitive touch sensors on film substrates, and in particular to those which incorporate four color graphics and designs behind clear plastic protective films.

2. Description of the Prior Art

Mass produced products like toys are highly sensitive to component costs. So circuits and construction methods for making interactive toys must be very inexpensive to manufacture.

A conventional inexpensive toy electric guitar for children has been made from sheets of paper cut in the shape of a guitar with a body, neck, and headstock, then essentially a photograph of an attractive guitar is printed on top. The printed photograph shows all the details of wood grain, frets, strings, saddle, sound hole, pickups, bridge and adjusting knobs. On the backside, a plastic film with printed circuits for touch pads is glued on using adhesives. This assembly is then fitted to a thick plastic body frame for support, and a pigtail from the printed circuits for the touch pads is plugged into an amplifier module.

The downside with this type of construction is the paper and adhesives can constitute the major component costs. And printing photographs on the outside on top of paper makes it very vulnerable to user wear and the environment. Such color printings on paper also tend to produce poor quality results, the lines and details are not sharp and crisp.

Subassemblies of capacitive touch sensors are very often manufactured in places in the world that have high humidity, and the shipping containers they are sent in can be dripping-wet inside. Paper based products do not survive well in these conditions, and metal based conductive inks tend to corrode and fail. So better alternatives with passivation coatings and protective finishes need to be supplied.

A few commercial products have used graphics printed on plastic, but they assemble their electronic capacitive touch sensors separately behind the graphic sheets. Such types of construction add to the costs and increase problems with reliability and service life. The manufacturing costs associated with mass produced consumer electronics are often the number one consideration behind functionality, and saving just a few cents per items can translate to millions of dollars in increased sales and profits.

What is needed is a thin, but rugged, capacitive touch sensor that is more attractive and less expensive to mass produce than conventional devices.

SUMMARY OF THE INVENTION

Briefly, a capacitive touch sensor embodiment of the present invention comprises a first plastic film on which keyboard graphics and other designs are disposed on the reverse side of the film, and basically the bare plastic substrate is all that is exposed to the environment and user wear. Non-conductive color inks are used in printing the graphics so that any printed capacitive touch sensors behind will not be short circuited or desensitized. A silk screen printing of an opaque layer is such that a print-free margin is left all around the edges to allow a later application of adhesive to grip a more durable surface underneath. The capacitive touch sensors are silk-screen printed, deposited or etched on a second plastic film with conductive inks or foils. This is then laminated with the printed sensors toward the graphics printed side of the first plastic film using a silk-screen applied liquid water-based adhesive. A final overcoat of adhesive is applied to the bare backside of the second plastic film for final assembly to a frame or chassis.

Embodiments of the present invention protect the graphics and sensor traces from both user wear and environmental exposure, and they do this in a cost effective way that can be produced in high volume.

These and other objects and advantages of the present invention will no doubt become obvious to those of ordinary skill in the art after having read the following detailed description of the preferred embodiments that are illustrated in the various drawing figures.

IN THE DRAWINGS

Figure 3:
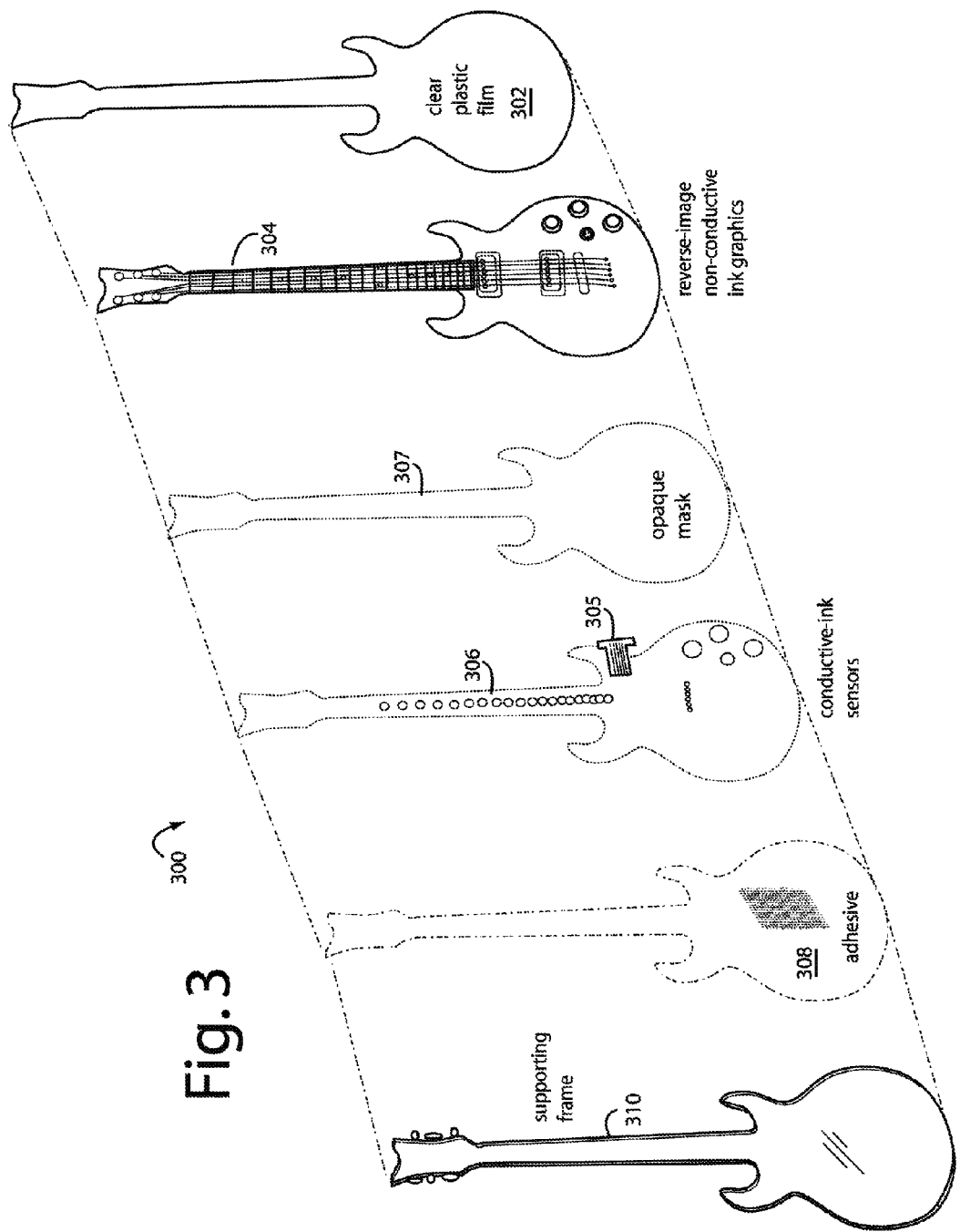
FIG. 3 is an exploded assembly view diagram of a toy guitar embodiment of the present invention, and is similar to the toy guitars of FIGS. 1 and 2 except that its conductive-ink sensors are disposed directly on the reverse-side of the reverse-image non-conductive ink layer or an intervening opaque mask.
Figure 4:
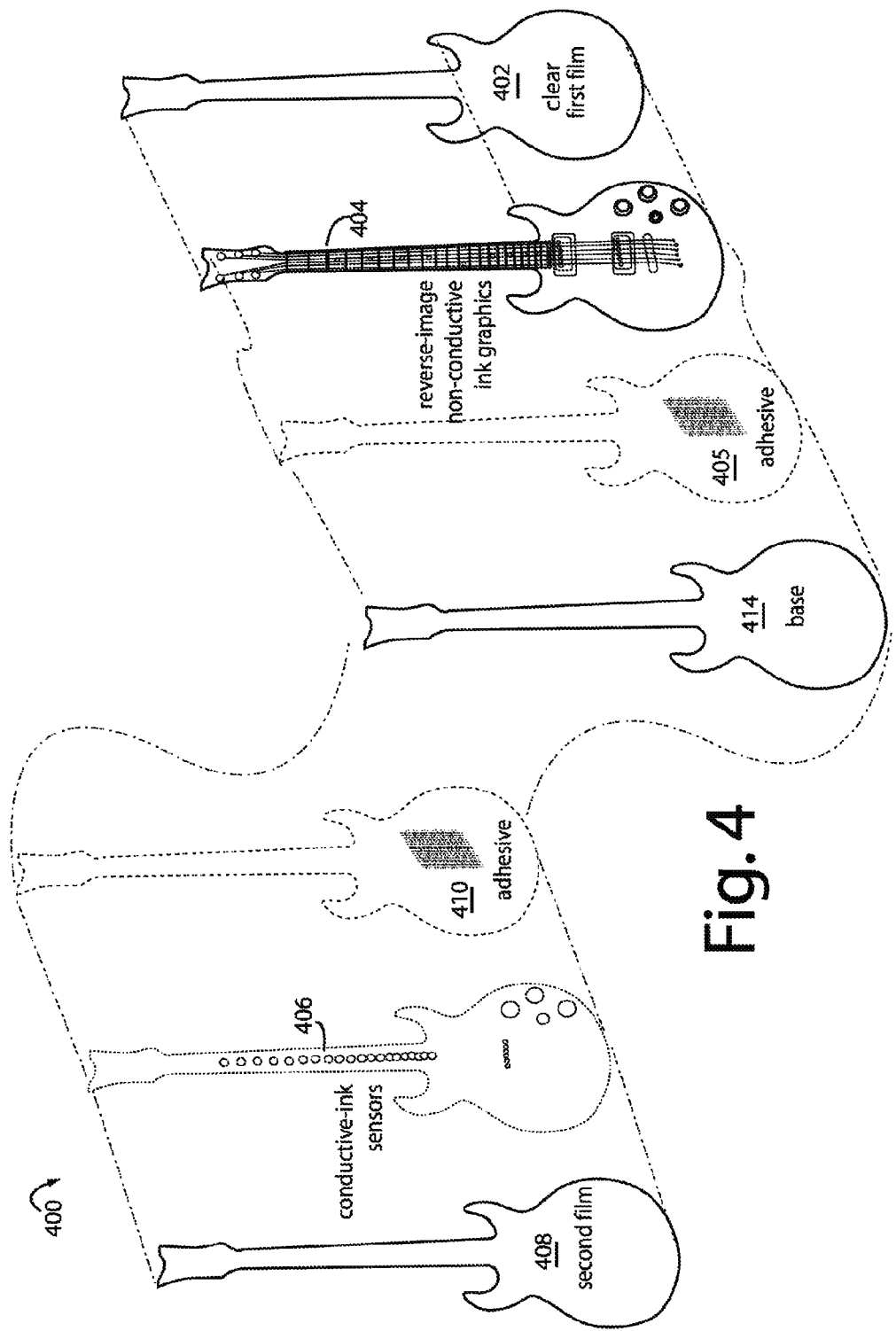
FIG. 4 is an exploded assembly view diagram of a toy guitar embodiment of the present invention, and is similar to the toy guitars of FIGS. 1-3 except that an intermediate baseboard is placed in front of the conductive-ink sensors on the front side of a second plastic film.
Figure 5:
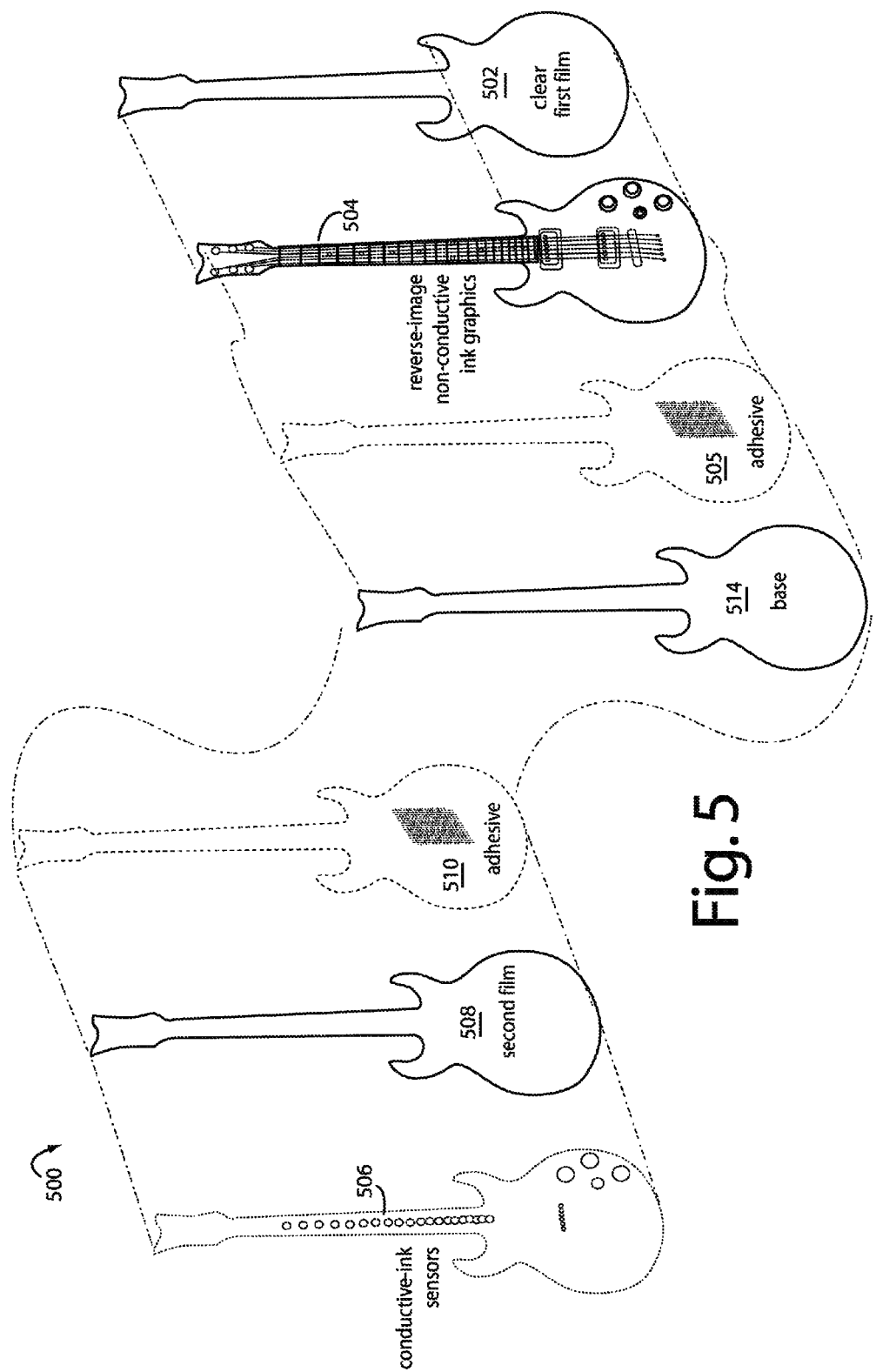
Figure 6:
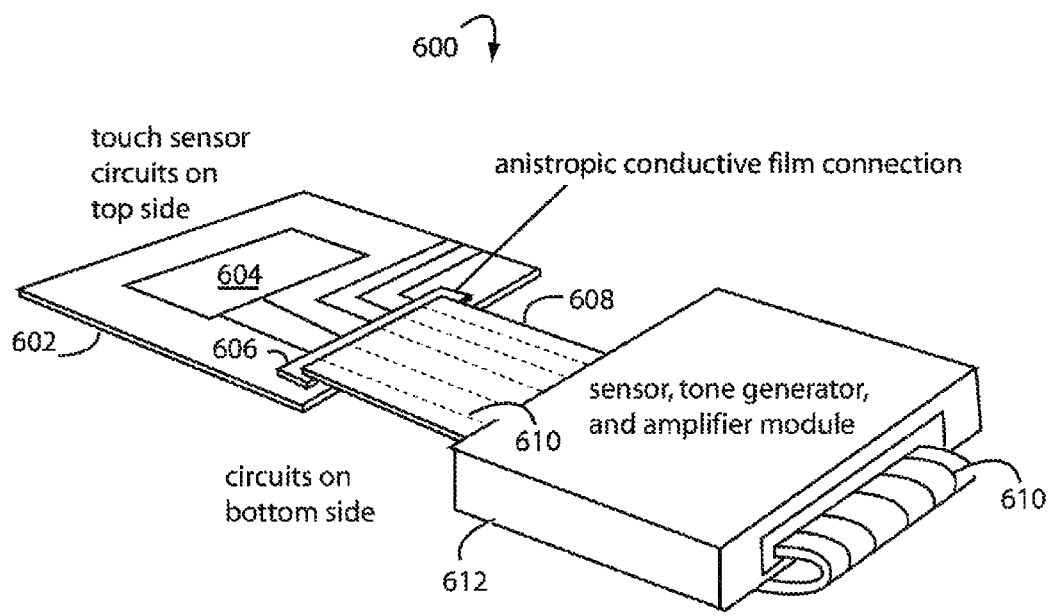
Figure 7:
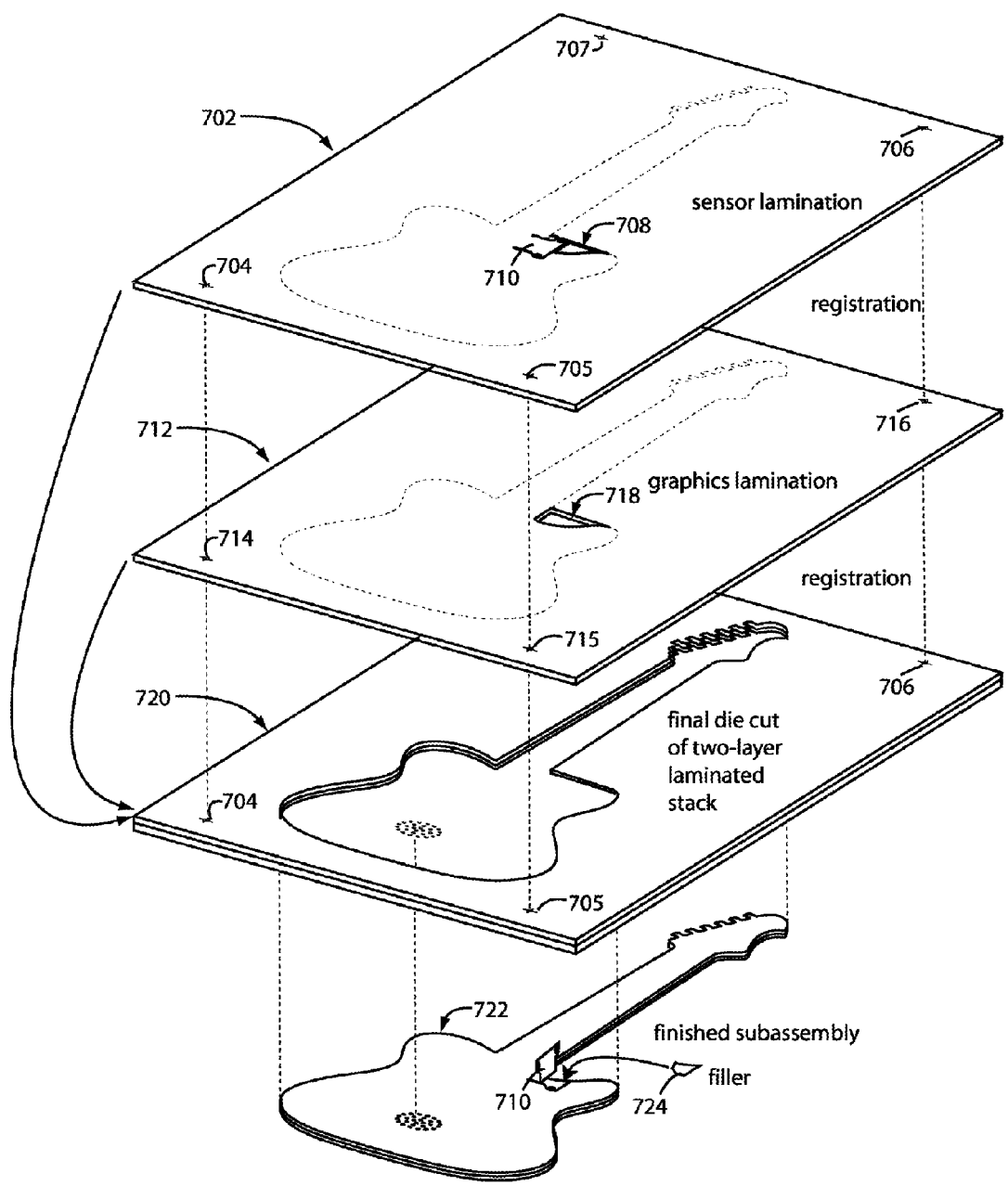

FIG. 5 is an exploded assembly view diagram of a toy guitar embodiment of the present invention, and is similar to the toy guitars of FIGS. 1-4 except that an intermediate baseboard is placed behind the reverse-image non-conductive ink layer and clear first plastic film, and the conductive-ink sensors are disposed on the backside of a second plastic film attached to the backside of the plastic baseboard;

FIG. 6 is a perspective view diagram of an adapter which uses anisotropic conductive film tape to connect a capacitive touch sensor to an electronics module; and FIG. 7 is an exploded assembly view showing how die cuts can be used in the sensor and graphics laminations of a two layer design to enable the mass production of various embodiments like the toy guitar shown.

DETAILED DESCRIPTION OF THE PREFERRED EMBODIMENT

Figure 1:
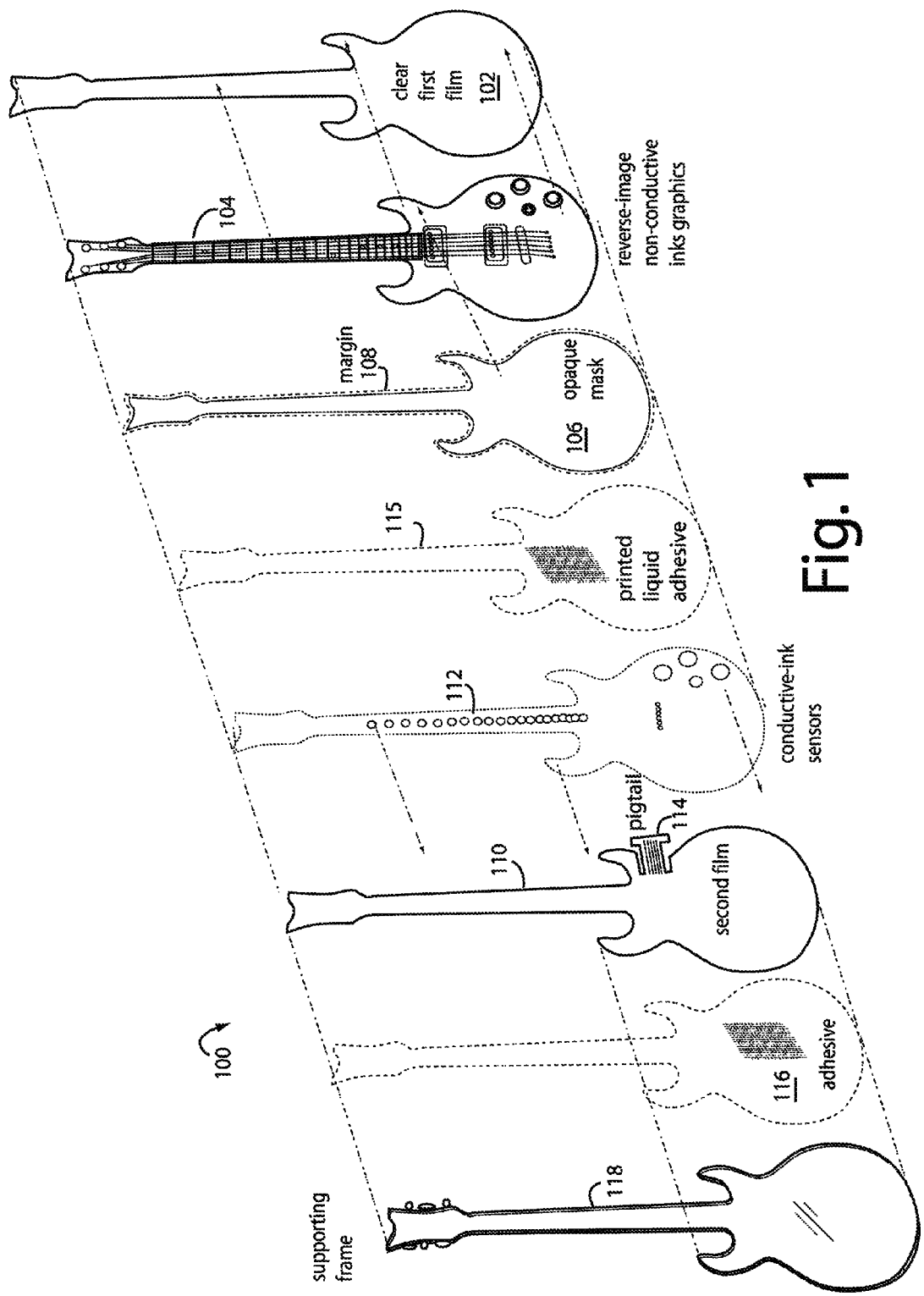
FIG. 1 is an exploded assembly view diagram of a toy guitar embodiment of the present invention.

Embodiments of the present invention span all consumer electronics device applications that are mass produced and depend on capacitive touch sensors for user interaction. For example, in one particular application, FIG. 1 represents a toy guitar embodiment of the present invention, and is referred to herein by the general reference numeral 100. Toy guitar 100 comprises a clear, first plastic film 102 on which designs and reverse-image graphics 104 of non-conductive inks are disposed on a reverse side. Substantially nothing more than a bare clear plastic substrate on a front side is ultimately exposed to the environment and user wear. The clear plastic film 102 can comprise clear, thin, flexible or rigid polyethylene terephthalate (PET), polycarbonate (PC), poly methyl methacrylate (PMMA), or similar plastics. The clear plastic film 102 is pre-treated with heat to reduce subsequent longterm shrinkage. Non-conductive four-color CMYK inks are used for reverse-image graphics 104. The materials used in the graphics and designs are such that any printed electronic capacitive touch sensors located immediately behind will not be electrically short-circuited nor desensitized by their mutual contact or proximity.

An opaque mask 106 is printed behind the reverse-image graphics 104, and a print-free margin 108 is left all around to allow any sequent application of liquid adhesive a tougher surface to grip on to. It was found in drop-test experiments that a typical opaque mask 106 can delaminate at its edges in the area of print-free margin 108.

A second plastic film 110 with a pattern of capacitive touch sensors 112 are silk-screened, deposited, or etched with conductive inks or foils on its front side. The respective capacitive touch sensors are mapped or registered with corresponding images represented in the reverse-image graphics and designs of non-conductive inks 104. Capacitive touch sensors 108 are a patterned layer of conductive inks configured for electronic touch sensing of finger contacts on the front side of the first plastic film 102. A pigtail 114 provides for the electrical connection of capacitive touch sensors 112 to an electronics module that provides touch sensing, tone generation, and amplification.

A laminating adhesive 115 is applied to the backside of the opaque mask 106 and margin 108 using a silk-screen applied liquid water-based adhesive. The particular adhesives used need to be applied precisely and uniformly, and so screen printing is a very good method to use. Of course, other kinds of adhesives can be applied with various conventional methods that allow for the adhesive-free margin 112.

In one application, 3M™ SP7533 Screen-Printable water-based adhesive was applied at 0.012 mm (0.47 mils) thickness and provided good results. 3M Screen-Printable Adhesive SP7533 is a waterborne emulsion adhesive. Once dried, this adhesive can not be re-emulsified, and therefore provides a humidity barrier that can stop corrosion of the conductive inks and foils that would otherwise occur. Drying times range from five minutes at 160-degrees Fahrenheit to thirty minutes at seventy-seven degrees Fahrenheit. 3M publishes a February, 2003, *Application Guide* and a *Technical Bulletin* available on the Internet. A final overcoat of adhesive is applied to the bare backside of the second plastic film 110 for final assembly to a frame or chassis 114.

In one alternative, the pattern of capacitive touch sensors 108 is etched from conventional copper-clad flexible printed circuit board materials. In another example, they are printed on the second plastic film 110 with silk-screen printers using silver, carbon, copper, indium-tin oxide (ITO), nano-particles, or other impregnated inks. The materials used for the second plastic film 110 need not be clear, or transparent, but they should be heat-treated to reduce shrinkage and otherwise treated to improve surface bonding. Therefore, polyvinyl chloride (PVC), acrylonitrile butadiene styrene (ABS), and other types of opaque thermoplastics can be used. ABS polymers are resistant to aqueous acids, alkalis, concentrated hydrochloric and phosphoric acids, alcohols and animal, vegetable and mineral oils. ABS polymers can be swollen by glacial acetic acid, carbon tetrachloride and aromatic hydrocarbons, and are attacked by concentrated sulfuric and nitric acids. ABS polymers are soluble in esters, ketones and ethylene dichloride.

A laminating adhesive 116 is applied to the backside of the second plastic film 110 using a silk-screen applied liquid water-based adhesive for assembly into a supporting frame 118. The first and second plastic films 102 and 110 with their respective printings and adhesives are mounted into a supporting frame 118. Pigtail 114 is folded over and passed through supporting frame 118 for connection to an electronics module (such as shown in FIG. 6).

Although a toy guitar application has been illustrated as an exemplary embodiment, other embodiments are also cost effective and attractive. For example, as a drum, a keyboard, or touch pad for a laptop portable computer, and even a smart phone.

An entire assembly of printed plastic and sensors may be connected to electronic circuitry with an anisotropic conductive film (ACF) or conductive pressure-sensitive adhesive (PSA) bond. Such can then be fastened to a toy, a door, a backpack, clothing, and another surfaces with an appropriate adhesive. These devices are useful in products that employ touch sensing through plastic, and add a new dimension with the colorful, sharp, and durable graphics made possible.

Figure 2:
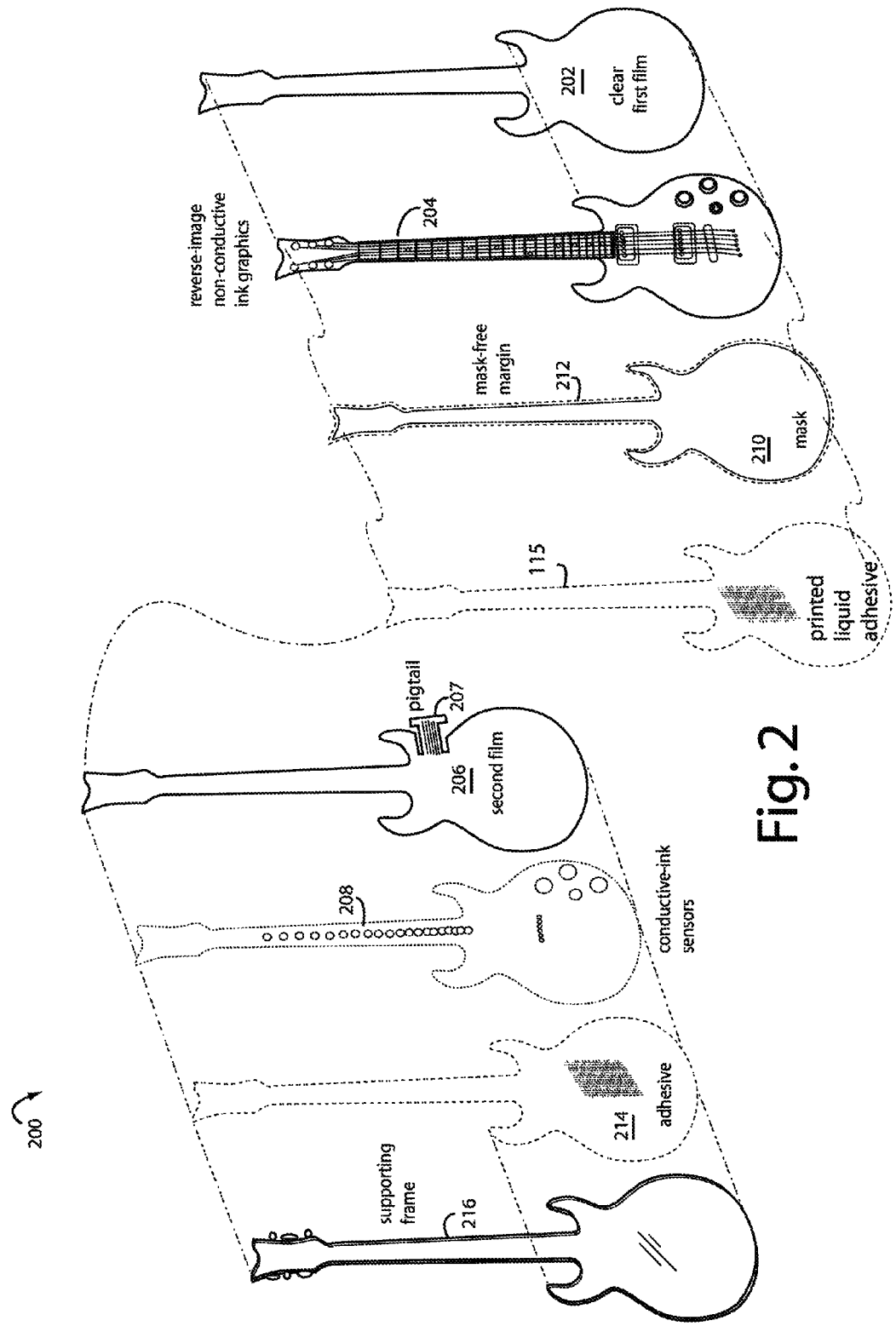
FIG. 2 is an exploded assembly view diagram of a toy guitar embodiment of the present invention, and is similar to the toy guitar of FIG. 1 except that its conductive-ink sensors are on the reverse-side of the second plastic film.

FIG. 2 represents another toy guitar embodiment of the present invention, and is referred to herein by the general reference numeral 200. It is similar to toy guitar 100, except that its conductive-ink sensors are on the reverse-side of the second plastic film. Toy guitar 200 comprises a clear, first plastic film 202 on which reverse-image graphics and designs of non-conductive inks 204 are disposed principally on a reverse side. The plastics used in film 202 can comprise clear, thin, flexible or rigid polyethylene terephthalate (PET), polycarbonate (PC), acrylic, or similar plastics. Only the bare clear plastic substrate on a front side is ultimately exposed to the environment and user wear.

A second plastic film 206 with a pigtail connector 207 has a pattern of printed sensors 208 deposited or etched with conductive inks or foils on its reverse side. An adhesive lamination layer 210 joins the bare front side of the second plastic film 206 to the reverse-image non-conductive inks 204 using a silk-screen applied liquid water-based adhesive. An opaque white-free margin 212 is left all around the outside edges of the opaque-white print layer 210. A final overcoat of adhesive 214 provides for final assembly to a frame or chassis 216.

The primary benefits of constructing sensors like those of FIG. 2 include a thin assembly, less use of toy plastic, durable, rugged silver ink traces that flex with the main toy body, environmentally stable, high graphic clarity, improved sensor sensitivity and response time, reduced toy packaging, and affordable construction and manufacturing processes. Using PET avoids inferior materials like paper or cardboard that absorb water and are vulnerable to user wear and tear.

FIG. 3 represents a further toy guitar embodiment of the present invention, and is referred to herein by the general reference numeral 300. It is similar to toy guitars 100 and 200, except that it is a single layer implementation with conductive-ink sensors disposed directly on the backside of the reverse-image non-conductive ink layer. Toy guitar 300 comprises a clear plastic film 302 on which reverse-image graphics and designs in a non-conductive ink layer 304 are disposed only on a reverse side. A pigtail connector 305 is attached to a sensor layer 306 that is deposited directly on the reverse side of the non-conductive ink layer 304. An opaque mask 307, such as white paint, is used between the non-conductive ink layer 304 and the sensor layer 306 to prevent the sensor patterns from showing through to the user. If indium tin oxide (ITO) conductors were used for the sensor conductors and pads, opaque mask 307 may not be necessary since ITO material is transparent and would not necessarily show through the non-conductive ink layer 304. An overcoat of adhesive 308 provides for a humidity barrier and final assembly to a frame or chassis 310. A passivation coating would also be beneficial in extremely wet environments.

FIG. 4 represents a still further toy guitar embodiment of the present invention, and is referred to herein by the general reference numeral 400. It is similar to toy guitars 100, 200, and 300, except that the conductive-ink sensors are disposed on the front side of a second plastic film and attached to the backside of a stiff baseboard. Toy guitar 400 comprises a clear plastic film 402 on which reverse-image graphics and designs in a non-conductive ink layer 404 are disposed only on a reverse side. An adhesive layer 405 bonds the clear plastic film 402 non-conductive ink layer 404 to a conductive ink sensor layer 406 which is deposited on the front side of a second plastic film 408. Another adhesive layer 410 bonds the conductive ink sensor layer 406 and the second plastic film 408 to the backside of a relatively thick and stiff plastic baseboard 414. The adhesive 410 provides for a humidity barrier that protects the conductive inks from corrosion and oxidation. The plastic baseboard 414 is made of ABS, polycarbonate, or similar materials, and is attached with fasteners or adhesives. The plastic baseboard 414, conductive ink sensor layer 406, and the second plastic film 408, are assembled behind the plastic film 402 and the non-conductive ink layer 404.

FIG. 5 represents another toy guitar embodiment of the present invention, and is referred to herein by the general reference numeral 500. It is similar to toy guitars 100, 200, 300, and 400, except that the conductive-ink sensors are disposed on the backside of a second plastic film and attached to the backside of a stiff baseboard. Toy guitar 500 comprises a clear plastic film 502 on which reverse-image graphics and designs in a non-conductive ink layer 504 are disposed only on a reverse side. An adhesive layer 505 is applied to the backside of non-conductive ink layer 504. A conductive ink sensor layer 506 is deposited on the backside of a second plastic film 508. An adhesive layer 510 bonds the conductive ink sensor layer 506 and the second plastic film 508 to the backside of a relatively thick and stiff plastic baseboard 514. The adhesive 510 provides for a humidity barrier that protects the conductive inks from corrosion and oxidation. The plastic baseboard 514 is made of ABS, polycarbonate, or similar materials. The plastic baseboard 514, conductive ink sensor layer 506, and the second plastic film 508, are assembled behind the plastic film 502 and the non-conductive ink layer 504 with fasteners or adhesives.

The electrical connection of the conductive ink sensor layers 108, 208, 306, 406, and 506, to a sensor, tone generator, and amplifier electronics module is sometimes complicated by the conductors being on the "wrong" side of the carrier film. The usual configurations in practice include a finger of plastic film from the substrate supporting the conductive ink sensor layers that is folded over behind to plug into a connector on the electronics module. If there is a mismatch because of the single-sided circuit board configurations involved, the connections need to be "flipped-over" with an adapter or pigtail.

FIG. 6 illustrates an adapter 600. 3M™ Anisotropic Conductive Film adhesives and tapes can be used to replace more expensive soldering and mechanical fastener alternatives that would otherwise be needed in the applications illustrated in FIGS. 1-5. A capacitive touch sensor comprising a substrate film 602 with printed conductive ink circuits 604 on a top side are interfaced through an anisotropic conductive film adhesive tape 606 to a pigtail flex circuit 608. Its conductors 610 are on the bottom side and that fits with a sensor, tone generator, and amplifier module 612.

3M describes its electrically conductive adhesive transfer tape 9703 as a pressure sensitive adhesive (PSA) transfer tape with anisotropic electrical conductivity. The PSA matrix is filled with conductive particles which allow interconnection between substrates through the adhesive thickness (Z-axis) which are spaced far enough apart to be electrically insulating in the plane of the adhesive. The PSA tack properties and no thermal curing needed make tape 9703 easy to use in assembly operations. Tape 9703 electrically connects and mechanically bonds medium pitch flexible circuits with other flexible circuits (flex), rigid printed circuit boards (PCB) or LCD screens. Electrically conductive tape 9703 has good adhesion to common PCB substrates such as copper, gold, FR-4 epoxy, Kapton™ polyimide and polyester films. Mechanical clamping is sometimes advisable. Tape 9703 also electrically connects and mechanically bonds EMI/RFI shield and gaskets to metal frames and enclosures. The low contact resistance and tape construction result in good EMI performance. Tape 9703 can be applied as die cut parts or in roll form and has good adhesion to common EMI/RFI substrates such as aluminum, stainless steel, and smooth gasket materials.

Opaque white masks with paint-free margins are included to optimize adhesion characteristics. Another benefit of using single layer construction is that the conductive traces are closer to the surface and thus able to achieve a better capacitive response than other designs.

Combinations of the various building blocks described here can be used to make decorative capacitive sensors. The opaque masks described are primarily included obscure any view of the sensor layer, underlying structures, lighting, etc. from leaking through to the user. However, if the graphics used are dense enough, that alone can be relied on to hide the sensors. In some cases, it may be acceptable if the sensors and other devices visually show through, in which case the add-on opaque layers can be omitted.

Single-layer solutions are fully integrated devices. In one type, the color graphics, opaque mask, printed silver ink touch sensors, and adhesive application are all disposed on a back side of a PET layer, for example. In a second type of single layer solution, the color graphics and a top coating or laminated thin clear PET film are disposed on the front side of a heavier PET layer. An opaque mask, printed silver ink touch sensors, and adhesive application are disposed on a back side, for example.

Two-layer solutions, such in FIG. 1, assemble a graphics lamination in front of a sensor lamination. In a first type of graphics lamination, the color graphics, opaque mask, and adhesive application are all disposed on a back side of a PET substrate, for example. In a second type of graphics lamination, the color graphics and a top coating or laminated thin clear PET film are disposed on the front side of a heavier PET layer. An opaque mask and adhesive are applied to the back side. If the graphics lamination includes an opaque layer or PET substrate, then the sensor lamination need not include it.

Three-layer solutions include a two-layer solution with a base material inserted between the graphic and sensor laminations. The thickness of the base material is limited by how much the sensors will be desensitized. The base layer can be opaque, and so an additional opaque layer to hide the sensors is not required in either of the two laminations.

Multi-layer sensor solutions can include the above one, two, or three-layer solution with an additional sensor laminations assembled to the back side in order to create a multi-dimensional sensor array.

Double-sided graphic solutions can be realized by starting with a one, two, or three-layer solution, and then attaching another graphic lamination on the back side such that the graphic faces reverse. Single layer devices can be deployed on both the front or back sides of an application that requires equal qualities and responses on each side.

Double-sided graphics with complex arrays of sensors can be constructed using the above multi-layer sensor solutions with a graphic laminated to the back like in the double-sided graphic solution. The second sensor layer can comprise touch sensors deposited on top of a PET later, with an opaque mask and adhesive applied underneath.

Embodiments of the present invention employ alternative kinds of electrical connections for the capacitive touch sensors. Low temperature methods are required because excessive heat like used, e.g., in soldering will deform the PET film materials supporting the silver-ink features. Pigtail 114, for example in FIG. 1, can be an extension of the second plastic film 110, or a separate piece attached and connected with anisotropic conductive pressure sensitive adhesive tapes. A single-sided pigtail 114 or electrical interface can be made of etched or printed conductive traces to make a bridge connection from the sensors to their supporting electronics. Such method has the effect of making the connection to the electronics on the opposite side of the connector when that is needed.

Vias can be used on double-sided pigtails and electrical interfaces to connect one side to the other. This has effect of making the connection to the electronics on the same side as an integrated connector would. Such approach would be needed when an integrated connector is not an option, as it can be for single-layer solutions in which the pigtail is limited to the boundaries of a graphic.

In two-layer solutions in which the pigtail has to be inside the perimeters of the graphics lamination, a bump can show through or be felt. A filler piece of equal thickness will then be needed to surround the pigtail lead and even out the intervening laminations.

FIG. 7 represents a way a two-layer solution can be mass produced. A sensor lamination 702 is manufactured in a rectangular sheet with registration indexes 704-707. A die cut 708 is made in the form of a pigtail 710. A graphics lamination 712 is also manufactured in a matching rectangular sheet with registration indexes, e.g., 714-716. A die cut 718 is made to finish the area that will lie under the pigtail 710 and that would otherwise be obscured in later die cuts of a finished assembly. The sensor lamination 702 is joined to the graphics lamination 712 by an application of liquid adhesive applied by silk-screen. The immediate area under pigtail 710 is blocked from receiving the adhesive so that the pigtail can be folded up after a final die cut represented by two-layer sheet 720. A finished subassembly 722 is ready for installation in a supporting frame and the attachment of pigtail 710 to an electronics module.

A filler 724 can be cut and inserted in the area of graphics lamination 712 under the area of pigtail 710 that was folded up.

The successful printing of conductive, silver-ink circuits and patterns on top of PET with four-color graphics and opaque masks requires thicker and more viscous inks than normal to bridge the gaps and prevent breaks that would otherwise occur during curing. The thickness of the lines used in experiments was one millimeter pitch minimum, meaning at least one millimeter between lines and 0.5-1 mm silver ink traces. The viscosity of the ink was not high, but it was higher than normal silver ink. The thickness was controlled by mixing different components together and was not quantified. The PET plastic was good up to 140 degrees centigrade, and was a high temperature grade PET.

A thinner silver ink PET layer can be used in order to minimize the cost of that layer. Single layer construction eliminates an extra PET layer and adhesive layer that can be costly and increase lower labor costs. Using screen printable adhesives can reduce the amount of wasted material and labor. Die-cutting machines can be use to produce both alignment holes and features, thus increasing accuracy and reducing the number of production steps. Laminations using alignment holes, as in FIG. 7, can obtain accuracies of 0.2 mm at minimal cost by using automated alignment hole cutting machines and high accuracy partial laminations to hold the pieces in place for full lamination. This allows for low cost high accuracy because it doesn't require placement machines and can be done quickly by unskilled labor.

Using white PET to obscure the conductive traces of the sensor layers can cause the adhesives to become more visible. The viscosity of the adhesive is therefore lowered, making it even more uniform and using a thinner coat than usual to make it less visible.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claim is:

1. A touch-operated electronics assembly, comprising:
 a first plastic film having a front side for exposure to the environment and users and a back side, and comprising clear materials;
 a reverse-image non-conductive ink printing disposed on said back side of the first plastic film;
 a second plastic film having a back side on which a patterned layer of conductive inks is disposed;
 a masking layer on the back side of the first plastic film over and in back of the reverse-image non-conductive ink printing, wherein the masking layer comprises an opaque mask and a mask-free margin on the first plastic film around outside edges of the opaque mask, wherein the opaque mask is smaller than the first plastic film; and
 an adhesive layer that is larger than the opaque mask, wherein the adhesive layer joins the back side of the first plastic film to the second plastic film through the mask-free margin such that perimeter edges of the first plastic film is exposed to adhesive.

2. The touch-operated electronics assembly of claim 1, further comprising:
 an adapter for flipping circuit conductors from one side of a connection to the patterned layer of conductive inks to another side, and including an anisotropic conducting film tape with pressure sensitive adhesive.

3. The touch-operated electronics assembly of claim 1, wherein patterned layer of conductive inks has features registered and mapped to particular graphics represented in the reverse-image non-conductive ink printing.

4. A capacitive touch sensor, comprising:
 a clear first plastic film on which reverse-image graphics in non-conductive color ink are printed only on a reverse side, wherein a bare clear plastic surface on a front side of the first plastic film is ultimately exposed to the environment and user wear;
 a second plastic film with a pattern of printed electronic capacitive touch sensors printed on a back side of the second plastic film;
 a masking layer printed on the reverse side of the first plastic film over and in back of the reverse-image graphics, wherein the masking layer comprises an opaque mask and a mask-free margin on the first plastic film around outside edges of the opaque mask, wherein the opaque mask is smaller than the first plastic film; and an adhesive lamination layer that joins the second plastic film to the opaque mask, wherein the adhesive lamination layer is larger than the opaque mask, wherein the adhesive lamination layer joins the reverse side of the first plastic film to the second plastic film through the mask-free margin.

* * * * *